Dec. 9, 1958  C. G. GOETZEL ET AL  2,863,562
CORROSION RESISTANT SINTERED IRON-SILICON FILTER
Filed June 26, 1953  3 Sheets-Sheet 1
FIG. 1.
FIG. 2.
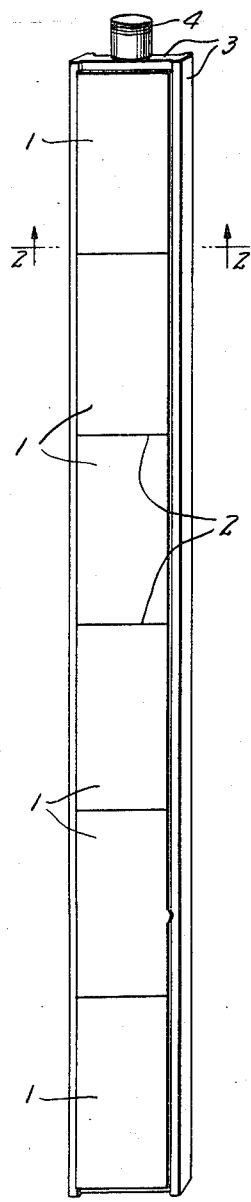
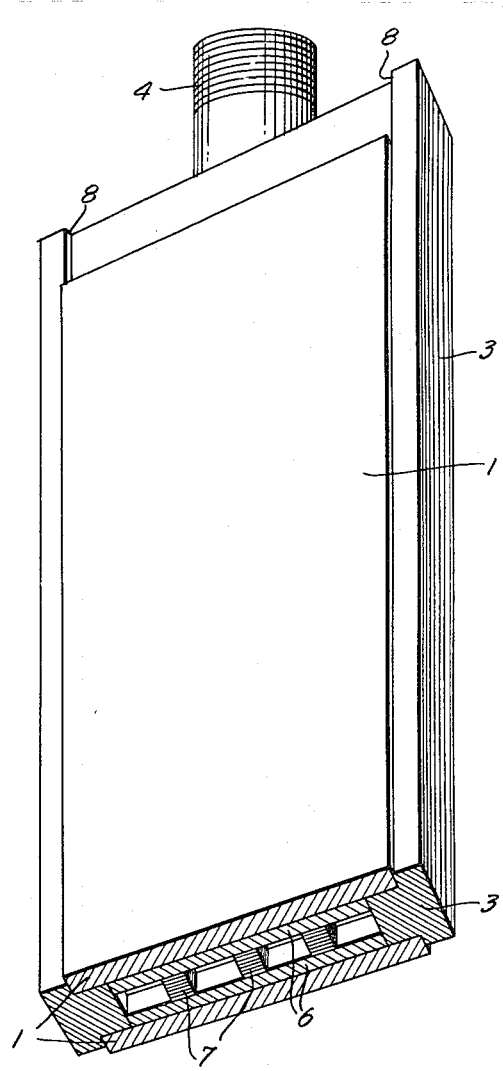
INVENTORS
CLAUS G. GOETZEL
JOHN L. ELLIS
BY
E. J. Kalil
AGENT

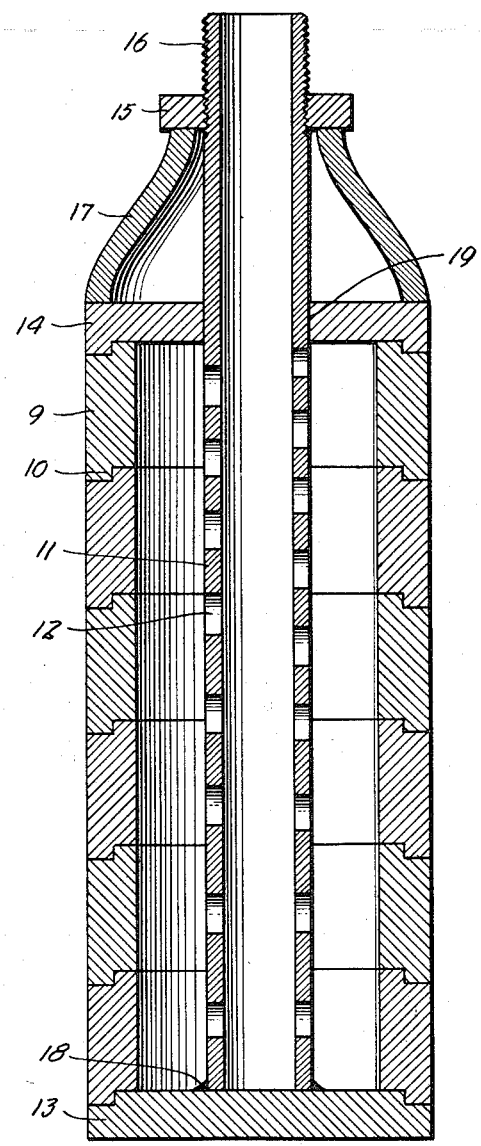

Dec. 9, 1958 C. G. GOETZEL ET AL 2,863,562
CORROSION RESISTANT SINTERED IRON-SILICON FILTER
Filed June 26, 1953 3 Sheets-Sheet 3

INVENTORS
CLAUS G. GOETZEL
JOHN L. ELLIS
BY
AGENT

United States Patent Office 2,863,562
Patented Dec. 9, 1958

2,863,562

CORROSION RESISTANT SINTERED IRON-SILICON FILTER

Claus G. Goetzel, Yonkers, and John L. Ellis, White Plains, N. Y., assignors to Sintercast Corporation of America, Yonkers, N. Y.

Application June 26, 1953, Serial No. 364,232

11 Claims. (Cl. 210—496)

The present invention relates to the production of porous metallic filter plates for use in corrosive media, and more particularly to porous metallic filters which may be fabricated into strongly jointed filter plate assemblies.

In many chemical processes, particularly processes involving corrosive media, filters are employed in the separation of certain phases, including the separation of finely divided solid particles from corrosive liquid phases, vapor phases or gaseous phases. In processes involving high reaction temperatures, the problem of obtaining filter materials having the desired resistance to heat, to corrosion, and to mechanical and thermal shock is particularly acute and presents many difficulties. This is especially true in providing filters for processes involving corrosive hot hydrocarbon vapors or liquids produced by the pyrolysis or cracking of hot hydrocarbons in the presence of a fluidized catalyst. Many of these processes are continuous and require the separation of the finely divided catalyst and effluent gaseous and/or liquid products for recirculation back into the system. Filters employed under such conditions must have certain requisite properties in order to achieve the separation of solids or other phases from corrosive hot hydrocarbon materials economically and satisfactorily. Hydrocarbons containing small amounts of sulfur in either the oxidizing or reducing condition further compound the corrosion difficulties, particularly at elevated temperatures. For example, under one operating condition of fluid catalysis involving a corrosive oxidizing hydrocarbons gas containing $SO_2$ and/or $SO_3$, an elevated temperature of about 1100° F. is employed with operating pressures varying up to as high as 500 pounds per square inch (p. s. i.). Under another operating condition involving a corrosive reducing hydrocarbon gas containing $H_2S$, an operating temperature of 950° F. is employed also with high pressures up to about 500 p. s. i.

While both types of sulfur-containing gases were chemically detrimental to many proposed metallic filter materials, the reducing sulfur-containing hydrocarbon gases, e. g., reducing gases containing $H_2S$, were particularly detrimental and usually caused severe chemical attack.

A filter comprised of stainless steel containing about 18% chromium, 8% nickel and 1% columbium, normally considered corrosion resistant in many applications, was inadequate when employed as a filter in the presence of aforementioned type gases, especially in the presence of reducing sulfur-containing gases. The filter was attacked considerably by such gases, particularly in the surface region to such extent as to interfere with economical operation. Filters comprised of substantially all tungsten or all molybdenum likewise were not suitable.

Attempts at employing inorganic non-metallic filters of the ceramic type were not too successful for, while ceramic filters appeared to have the necessary corrosion resistance, they frequently failed to resist mechanical and thermal shock on account of their inherent brittleness. There were additional disadvantages. For instance, in producing ceramic filter assemblies, it was difficult to obtain good ceramic-to-metal bond and such filters tended to fail at the bonded joint during service due to poor bonding, fluctuating service temperatures, differences in expansivity at and near the bonded joint, mechanical vibration, etc. Because of the aforementioned difficulties it was apparent that filter materials not only had to have adequate resistance to chemical corrosion, disintegration, etc., but in addition also had to have uniform porosity and permeability. It was also apparent that filter materials had to have adequate physical properties including adequate mechanical strength at room and elevated temperatures. It was furthermore apparent that filter materials had to be brazeable or weldable or otherwise be capable of being joined or fitted together into large filter units and be particularly capable of being joined or sealed to solid wrought or cast metal materials in the production of large filter plate assemblies. While the type of properties desired in such filters indicated that only metallic filter materials would be satisfactory, none of the materials proposed, as far as we are aware, was entirely satisfactory when carried out in practice on a commercial scale.

We have discovered that metallic filters or porous bodies can be produced suitable for use in corrosive media and having the desired combination of physical and chemical properties, including adequate mechanical strength at room and elevated temperatures, adequate resistance to mechanical and thermal shock, adequate resistance to corrosive media, including sulfur-containing gases, etc. The metallic filters produced in accordance with the invention are characterized by being amenable to ordinary fabrication methods in the production of large filters united by either brazing or other joining means, and also by being capable of being strongly joined or bonded with certain solid metal materials in the production of large filter assemblies.

Other advantages of the invention will become apparent from the following description taken in conjunction with the accompanying drawings in which:

Fig. 1 is a drawing showing an embodiment of one type of filter assembly comprised of porous filters of iron-silicon material produced in accordance with the invention;

Fig. 2 is an end section of Fig. 1 taken along the line 2—2 looking in the direction of the arrows;

Fig. 3 is illustrative of an embodiment of a cylindrical type filter assembly comprising cylindrical porous filter segments of iron-silicon material produced in accordance with the invention;

Fig. 4 is a drawing showing an embodiment of a porous filter unit produced in accordance with the invention;

Figure 5:
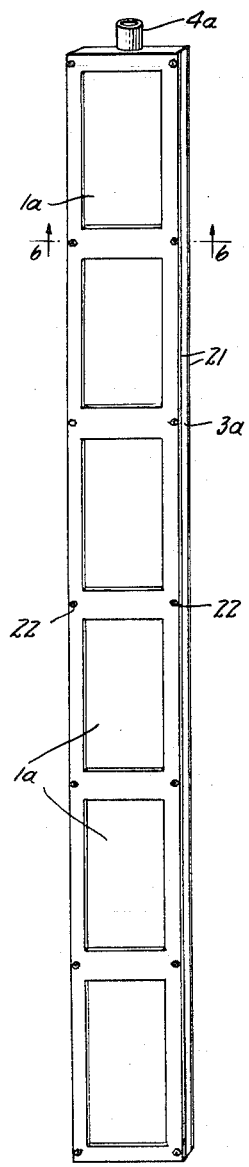
Fig. 5 illustrates another embodiment of a filter assembly comprised of porous filter plates of iron-silicon material produced in accordance with the invention.

In general the present invention contemplates a method for producing a metallic filter element containing effective amounts of silicon, said filter element having substantially all of the properties necessary for satisfactory operation in corrosive media particularly in reducing sulfur-containing atmospheres. The invention also contemplates the novel product produced by the method.

We have discovered that a filter element of greatly improved properties can be obtained by employing a silicon-containing alloy material in comminuted form and whose silicon content is at least 10% and up to about 60%, substantially the balance being iron which may also contain the usual incidental elements such as manganese, carbon, oxygen, nitrogen, etc. With respect to the nitrogen content, this element may be present in the iron-silicon material in amounts up to about 7%, preferably under 5%, as a result of pick-up when the processing steps are carried out at elevated temperatures in a nitrogen-containing atmosphere. Likewise, the iron-silicon alloy may contain up to about 2% carbon as a result of pick-up from the environment during processing or because of the starting material.

In carrying the invention into practice it is preferred that the comminuted iron-silicon alloy material employed contain about 35% to 55% silicon, as silicon in this range imparts exceptional corrosion resistance to the material in reducing sulfur-containing atmosphere.

In producing filter elements in accordance with the invention, a metallic silicon-containing material is selected having particles passing through 60 mesh, and preferably within the range of size distribution between minus 60-mesh to plus 200-mesh. A predetermined amount of the material is then placed into a graphite mold which is preferably protected with a surface coating of a substantially non-reacting ceramic, e. g. alumina, and a similarly protected graphite plunger inserted into the mold and the whole heated to a temperature of about 1000° C. to about 1200° C. The higher the carbon content up to 2% carbon, the lower should be the hot pressing temperature.

Sufficient pressure is applied to the plunger to compress the iron-silicon material to an apparent density corresponding to a density of about 50% to 80% of the actual density of the material. Pressures which have been found adequate range from about 400 p. s. i. to 1200 p. s. i. The amount of pressure applied during the heating up period may be at least about 400 p. s. i. while a pressure of 1100 p. s. i. has been found adequate at the hot pressing temperature. The desired porosity is determined by calculation beforehand and depends upon the actual density of the silicon-containing material, the weight of the material employed, and the final size and apparent density of the plate.

The actual density of the material will depend upon its silicon content. Iron-silicon alloys containing silicon in amounts ranging from about 10% to 60% have the following approximate densities:

| Percent silicon: | Density, grams/cm.$^3$ |
| --- | --- |
| 10 | 7 |
| 20 | 6.5 |
| 30 | 6.2 |
| 40 | 5.6 |
| 50 | 4.7 |
| 60 | 4 |

In producing a porous body having an apparent density of 50% actual density from comminuted iron-silicon material containing about 50% silicon and having the approximate density of about 4.7 grams per cubic centimeter (grs./cm.$^3$), the powder material is compacted to half of its actual density or to an apparent density of about 2.35 grs./cm.$^3$. Likewise, in producing a porous body having an apparent density of about 60% of the actual density, the powder material is compacted so that its apparent density is six-tenths of the actual density. In producing the desired density by compaction, the pressing is controlled by mechanical stops on the press so that the density of the final volume to which the material is pressed will correspond to the desired apparent density. In producing the desired porosities in this manner, the absolute value of the ultimate pressure is not too critical as long as it is great enough to overcome the resistance of the powder to pressure packing.

The soaking time at temperature is important, particularly since the bonding of the silicon-containing powder is generally difficult to achieve under ordinary hot pressing conditions. Metallic binders cannot be used in effecting bonding between the particles as in regular powder metallurgical operations because they tend to be detrimental to the final properties and to lower the resistance of the filter plates to surfur corrosion. Soaking times of about 7 minutes to 20 minutes for temperatures of 1100° C. to 1200° C. have been found to give satisfactory hot pressed bodies. Upon completion of the hot pressing operation, the mold and the contained plate is furnace cooled in a protective environment. Such a protective environment may comprise a reducing atmosphere of hydrogen. Or the protective environment may be a high temperature insulating powder material into which the mold and the contained plate may be embedded. A powder material known by the trade-mark "Norblack" comprising a specially treated type of ultra fine carbon powder has been found satisfactory.

If it is desired to produce a porous filter plate of uniform strength properties, the plate after completion of hot pressing may be subjected to a heat treatment or sintering at an elevated temperature in order to produce additional diffusion bonds at the points of contact between the silicon-containing particles in the body and to reduce any interference films, such as free carbon, on the exposed surface of the filter to render the filter plate amenable to joining by brazing or other means. The heat treatment or sintering may be carried out at about 900° C. to 1200° C. for about 10 minutes to 60 minutes while at temperature. A non-oxidizing atmosphere, e. g., hydrogen, helium, etc., may be employed which may be at a subatmospheric pressure of less than 700 microns of mercury column. To prevent warping of the plate during sintering, tungsten weights or other suitable weight or pressure may be applied to the plate. A load corresponding to a pressure of at least about 0.05 pound per square inch of plate surface is satisfactory during the heat treatment or sintering.

For a porous filter to be serviceable it must have certain properties which are usually determined and controlled by the physical characteristics of the material employed in making the filter, such as its grain size, its apparent density, etc., although to a large extent the properties are determined by fabrication methods. In determining the suitability of a filter for service, certain correlative properties are relied upon. These properties are usually represented by apparent density, standard flow-rate measurements of a gas (gas permeability) through the porous filter, certain strength properties, e. g. rupture or shear strength and, of course, its properties with respect to brazeability or other types of joining by the application of heat or joining where a sealing compound is employed.

For the purpose of giving those skilled in the art a better understanding of the invention, the following illustration examples are given:

Sample filters were prepared from a ferrosilicon powder containing approximately 50% silicon. Two size fractions of powder were used, one having a particle size of less than 100 mesh, the other having a particle size between minus 60 mesh and plus 100 mesh. A given weight of the powder was placed in an alumina-coated graphite mold and hot pressed with a similarly protected graphite plunger to a predetermined apparent density at a temperature in the range of 1000° C. to 1200° C. for at least 7 minutes. The porous plate produced was cooled, removed from the mold and then subjected to a special gas permeability pressure-drop test which comprised passing nitrogen through a section of the filter measuring about one and one-half inches in diameter at the surface and about one-eighth in thickness. The nitrogen was gaged to a 5 pound back pressure through a pressure reducing and regulating valve at a flow rate through the filter of about 5 liters per minute. The pressure drop across the one-eighth inch thick filter (also referred to as the permeability factor) was measured by a U-gage in inches of mercury column. Two filter samples which were produced from the minus 100-mesh powder had apparent density values of 73% and 77%. Also, two filter samples which were produced from the minus 60-mesh plus 100-mesh powder had apparent density values of close to 80%. Generally, each of the samples exhibited uniform porosity and indicated adequate strength suitable to enable their construction into filter units and assemblies. The samples also indicated suitable permeability factors as determined by the aforementioned test of flowing of nitrogen through a cross-sectional thickness of the filter of about one-eighth of an inch. The permeability factors corresponded to a pressure drop of less than 2.0 inches of mercury. Additional tests indicated that adequate permeability generally corresponds to a pressure drop change of 0.3 to 2.0 inches of mercury for apparent densities ranging from about 50% to 80% of the actual density of the iron-silicon material. This was generally indicated for iron-silicon materials containing 10% silicon to 60% and especially for material containing 35% to 55% silicon.

In determining the suitability of a filter to operate at elevated temperatures in a sulfur-containing atmosphere, comparative tests were resorted to simulating operating conditions. One such test which has been found very satisfactory in evaluating filters comprises passing a measured amount of a reducing sulfur-containing gas through a filter at atmospheric pressure and at an elevated temperature of about 950° F. over a period of about 6 to 7 days. Reducing sulfur-containing gases, i. e., reducing gases containing sulfur in the form of $H_2S$ are generally considered more corrosive to metal filters than oxidizing sulfur-containing gases. The effect of such reducing gases was determined on an iron-silicon alloy filter containing about 50% silicon. For comparison purposes, the test was also conducted on a stainless steel control filter sample. The gas employed in the test contained 5 mol percent $H_2S$ and 95 mol percent $H_2$. The test was carried out under atmospheric pressure at a temperature of about 950° F. over a period of 168 hours during which 44.6 gram-mols of gas were passed through each filter successively. Upon the completion of the test, the control stainless steel filter indicated a high weight increase due to corrosion of about 29.8% as compared to the iron-silicon filter sample which showed a very low weight increase due to corrosion of only 0.03% thus indicating that the silicon-containing material is many times more resistant to corrosion than the stainless filter. The stainless steel filter sample had an apparent density falling within the range of 50 to 80% of actual density of the stainless steel while the iron-silicon material had an apparent density close to 70% of its actual density.

As has been indicated hereinbefore, it is necessary in order to achieve the results of the invention that the iron-silicon material contain at least 10% silicon. If the material contains less than 10% silicon its resistance to corrosion is not generally satisfactory and in most instances is detrimentally affected, particularly in reducing sulfur-containing gases. Thus, when an iron-silicon filter material outside the scope of the invention and containing about 4% silicon and the balance substantially iron was tested under the aforementioned conditions in a reducing sulfur-containing gas of the same composition, the material indicated a high weight gain due to corrosion of over 35%. This filter had an apparent density of about 51% and a permeability factor corresponding to a pressure drop of about 0.62 inch of mercury. Likewise, when an iron-silicon filter material containing 6% silicon was similarly tested, the filter material indicated a high weight gain due to corrosion of about 34%. This filter material had an apparent density of about 55% and a permeability factor corresponding to a pressure drop of about 0.45 to 0.5 inch of mercury. When an iron-silicon filter material contains over 10% silicon, it has markedly improved resistance to corrosion at elevated temperatures in reducing sulfur-containing gases.

When producing iron-silicon filters of controlled porosity, it is essential that the filter have an apparent density ranging from about 50% to 80% of the actual density of the iron-silicon material when produced from powder having a particle size falling within the range of minus 60-mesh to plus 200-mesh and preferably within the range of minus 60-mesh and plus 100-mesh. It is desired that the filter have a permeability factor corresponding to a pressure drop of about 0.3 to 2.0 inches of mercury as measured across a thickness of one-eighth of an inch of the filter and a surface of one and one-half inches in diameter by the flow of nitrogen under a back pressure of 5 p. s. i. and a flow rate through the filter of 5 liters per minute. For a preferred apparent density range of 60% to 75% of actual density, a permeability factor corresponding to a pressure drop of about 0.5 inch to 1.1 inches of mercury is most desirable.

When filters are produced having the aforementioned essential and desirable properties, such filters can be employed in constructing filter assemblies either by joining the filters to each other or to wrought solid metal frame members, provided the solid metal members are resistant to heat and resistant to corrosion in sulfur-containing gases. Ordinary welding methods are not suitable due to extreme gassing at the weld areas caused by entrapped air from the porous filter which usually leads to cracking after cooling of the weldment. The Heli-Arc process of welding with 18–8 stainless as the weldment generally presents such difficulties.

In producing filter elements or assemblies, pressure and solid state joining methods involving the application of heat may be employed or a sealed joint comprising a portion of a filter unit fitted and joined to a solid member or another filter unit by a sealing compound may likewise be employed. It is essential when producing filter assemblies that the heat resistant metal frame material has a controlled linear coefficient of expansion compatible with that of the porous silicon-containing material and falls within the range of about 5 to 7.5 microinches per inch per degree F. measured over the temperature range of 0° F. to 1200° F. A tungsten-nickel-copper alloy comprising 90% tungsten, 7% nickel and 3% copper may be employed as the heat resistant frame material.

Heat resistant metals or alloys, such as ferritic chromium stainless steels, have been found particularly adaptable as structural filter frames in the production of filter assemblies. Ferritic stainless steel Type 430 is especially adaptable as a filter frame material and may be employed in producing assemblies from iron-silicon filter plates in that the expansion coefficient for Type 430 is compatible with that for the porous filter plate. The porous filter may be joined to a Type 430 stainless steel welded frame section by brazing with a boron-containing nickel-chromium alloy powder.

Other examples of ferritic stainless steels which are also suitable as filter frames are Types 443 and 446. In general such ferritic steels will have an average coefficient of expansion falling within the range of about 6 to 6.3 microinches per inch per degree F. over the temperature range 0° to 1200° F. Porous iron-silicon filter plates can be joined to such steels without thermally cracking or otherwise failing, or mechanically fitted to such steels and sealed by employing suitable sealing compounds.

The nominal compositions of such steels are as follows:

| Type | Percent C | Percent Cr | Percent Cu | Percent Fe |
|---|---|---|---|---|
| 430 | 0.12 max | 14.0 to 18.0 | | Bal. |
| 443 | 0.20 max | 18.0 to 23.0 | 0.90 to 1.25 | Bal. |
| 446 | 0.35 max | 23.0 to 27.0 | | Bal. |

In joining porous plates of iron-silicon materials to each other, a thin layer of minus 200-mesh iron-silicon powder may be employed as the joining material by using moderate pressure and heat.

Embodiments of filter assemblies within the scope of the invention are illustrated in Figs. 1, 2, 3, 4, 5, 6 and 7. Fig. 1 shows a filter assembly comprising a plurality of porous iron-silicon filter plates 1 joined to each other at their butt ends 2 and joined to a Type 430 stainless steel frame 3 which has a pipe nipple connection 4 at the exit end through which the material being filtered flows in leaving the filter assembly.

Fig. 2 illustrates a cut-away end portion of the filter assembly of Fig. 1 looking in the direction of the arrows 2—2 and shows locating recess 8 to receive filter plate 1. The cut-away end shows the cross-section of frame connecting bridge 6 supported by bracing blocks 7 and also shows cross-section of filter plate 1.

Fig. 3 illustrates an embodiment of a hollow cylindrical filter assembly comprising a plurality of hollow cylindrical segments of porous iron-silicon filter elements 9 joined and fitted to each other by a dovetail interlock 10 and assembled between a top cover plate 14 and a bottom base plate 13 of solid ferritic stainless steel, the base plate being welded at 18 to a ferritic stainless steel tube 11 having perforations 12, said tube running upwardly through the center of the cylindrical filter through the cover plate with a snug fit 19, the end of said tube having the threaded portion 16 with an adjustable lock nut 15 in pressing contact with a bell type cover 17 comprised of a high expansion alloy capable of maintaining a substantially tight fit throughout the assembly at elevated temperatures.

Various other embodiments of filter assemblies containing at least one supporting structure can be produced by employing various types of filter body shapes. One type of part for a filter assembly may be produced from two curved porous filter plates measuring about 6 inches long by 3 inches wide by ⅛ of an inch thick and showing in transverse cross section an outer convexed surface and an inner concaved surface. The two curved plates may be joined by contacting them together at their edges with their respective concaved surfaces opposing each other by employing a boron-containing nickel-chromium alloy powder as the brazing or joining material. The brazing may be effected by applying a moderate pressure of about 0.05 p. s. i. at a temperature of about 1100° C. to 1200° C. for a suitable period of time. The aforementioned type of part for a filter assembly is illustrated in Fig. 4. Of course, it is appreciated that many ramifications of filter structures may be produced from the porous iron-silicon filter materials described and disclosed herein. For example, flat porous iron-silicon filter plates or porous filter plates of other shapes can be employed in producing large filter assemblies. Likewise hollow cylindrical segments of porous iron-silicon filters can be employed in forming a hollow cylindrical filter assembly.

Fig. 5 shows another embodiment of a filter assembly comprising a plurality of porous iron-silicon filter plates 1a held tightly together against a Type 430 stainless steel frame 3a by means of a similar stainless steel clamp-down frame 21 clamped into position by clamping screw 22.

Figure 6:
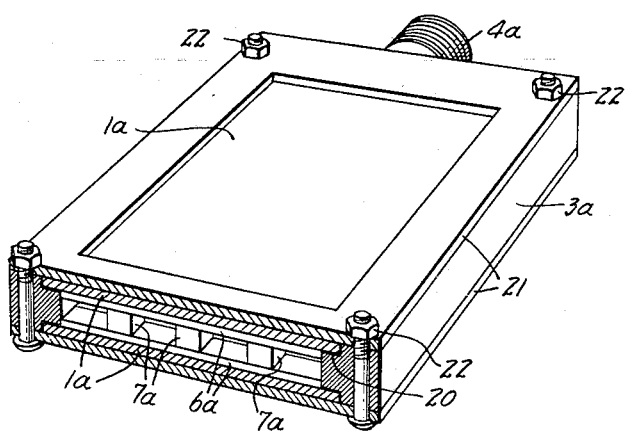
Fig. 6 is an end section of Fig. 5 taken along the line 6—6 in direction of the arrows.

Fig. 6 illustrates a cut-away end portion of the filter assembly of Fig. 5 looking in the direction of the arrows 6—6 and shows cross-section of machined recess 20 in frame 3a against which filter plate 1a is held into position in contact with a sealing compound by clamp-down frame 21 and screw 22. The cut-away end also shows cross-section of filter plate 1a supported by connecting bridge 6a which is in turn supported by bracing blocks 7a.

Figure 7:
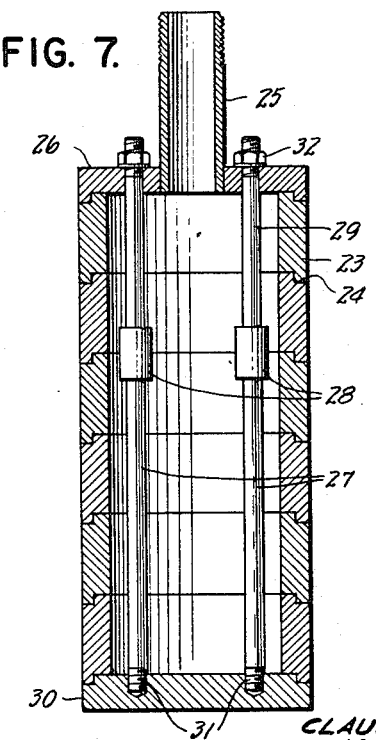
Fig. 7 is illustrative of an embodiment of a cylindrical type filter assembly comprising cylindrical porous filter segments of iron-silicon material produced in accordance with the invention.

Fig. 7 is a further embodiment of a hollow cylindrical filter assembly comprising a plurality of hollow cylindrical segments of porous iron-silicon filter elements 23 joined and fitted to each other by a dovetail interlock 24 with a sealing compound and assembled between a top cover plate 26 having a pipe nipple connection 25 and a bottom base plate 30 of solid ferritic stainless steel, the base plate 30 and cover plate 26 being held in position by means of tie rods comprising a tungsten portion 29 and a ferritic stainless steel portion 27 joined by a threaded coupling 28, the tie rods holding the base and cover plates in position by a screw fit 31 in the base plate 30 and by an adjustable lock nut 32 in pressing contact with cover plate 26. The ratio of length of the stainless steel portion of the tie rod to the tungsten portion is approximately 2:1 in order that the overall coefficient of expansion of the tie rod will be compatible with that of the iron-silicon filter material.

While porous iron-silicon filters produced in accordance with the invention are particularly applicable to the filtering of solid particles from corrosive sulfur-containing gases, for example in the pyrolysis or cracking of hydrocarbons, they may be employed in other corrosive media under similar conditions.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

What is claimed is:

1. A method for producing a porous metal body from an iron-silicon alloy material, which comprises providing a powder of the material containing about 10% to 60% silicon and having a particle size distribution falling within the range of minus 60-mesh to plus 200-mesh and hot pressing said powder to a predetermined volume at a pressure at least sufficient to overcome the resistance of the powder to packing at a temperature falling within the range of about 1000° C. to 1200° C. for a time sufficient to obtain a coherent porous body having an apparent density corresponding to about 50% to 80% of the density of the iron-silicon material characterized by improved resistance to corrosion by reducing sulfur-containing atmospheres at an elevated temperature of the order of about 950° F.

2. A method for producing a porous filter element from iron-silicon alloy material, which comprises providing a powder of the material containing 35% to 55% silicon and having a particle size distribution falling within the range of minus 60-mesh to plus 200-mesh, hot pressing said powder to a predetermined volume at a pressure at least sufficient to overcome the resistance of the powder to packing at a temperature falling within the range of about 1100° C. to 1200° C. for about 7 to 20 minutes followed by a sintering heat treatment in a nonoxidizing atmosphere at a temperature of about 900° C. to 1200° C., whereby a coherent porous filter element is produced having an apparent density corresponding to about 50% to 80% of the density of the iron-silicon material and having improved resistance to corrosion by reducing sulfur-containing atmospheres at an elevated temperature of the order of about 950° F.

3. A method for producing a porous filter element from iron-silicon alloy material, which comprises providing a powder of the material containing about 35% to 55% silicon and having a particle size distribution falling within the range of minus 60-mesh to plus 200-mesh, hot pressing said powder to a predetermined volume at a pressure at least sufficient to overcome the resistance of the powder to packing at a temperature falling within the range of about 1100° C. to 1200° C. for about 7 to 20 minutes followed by a sintering heat treatment in non-oxidizing atmosphere at a temperature of about 900° C. to 1200° C. for about 10 to 60 minutes, whereby a coherent porous filter element is produced having an apparent density corresponding to about 60% to 75% of the density of the iron-silicon material and having improved resistance to corrosion by reducing sulfur-containing atmospheres at an elevated temperature of the order of about 950° F.

4. A porous filter body comprising an iron-silicon alloy containing about 10% to 60% silicon and the balance substantially iron, said porous body being formed of sintered particles of size less than 60 mesh, said body having an apparent density corresponding to about 50% to 80% of the density of the iron-silicon alloy and characterized by improved resistance to corrosion by reducing sulfur-containing atmospheres at an elevated temperature of the order of about 950° F.

5. A porous filter body comprising an iron-silicon alloy containing about 35% to 55% silicon and the balance substantially iron said body being formed of sintered particles of size less than 60 mesh, the apparent density of said body corresponding to about 60% to 75% of the density of the iron-silicon alloy and characterized by improved resistance to corrosion by reducing sulfur-containing atmospheres at an elevated temperature of the order of about 950° F.

6. A structural filter assembly characterized by improved resistance to corrosion by reducing sulfur-containing atmospheres at above 950° F., comprising at least one porous iron-silicon alloy filter element with at least a portion of a heat resistant metal supporting structure joined thereto, said iron-silicon filter element being formed of sintered particles of size less than 60 mesh comprising a composition of about 10% to 60% silicon with the balance substantially iron, and having an apparent density corresponding to about 50% to 80% of the density of the iron-silicon alloy, said heat resistant metal of said supporting structure having an average coefficient of linear thermal expansion over the temperature range of 0° to 1200° F. of at least about 5 but not exceeding 7.5 microinches per inch per degree F.

7. A structural filter assembly characterized by improved resistance to corrosion by reducing sulfur-containing atmospheres at about 950° F., comprising at least one porous iron-silicon alloy filter element with at least a portion of a heat resistant metal supporting structure joined thereto, said iron-silicon filter element being formed of sintered particles of less than 60 mesh comprising a composition of about 35% to 55% silicon with the balance substantially iron and having an apparent density corresponding to about 60 to 75% of the density of the iron-silicon alloy, a permeability factor equivalent to about 0.3 to 2.0 determined across an approximately one-eighth inch cross-section, said heat resistant metal of said supporting structure having an average coefficient of linear thermal expansion over the temperature range of 0° to 1200° F. of at least 5 but not exceeding 7.5 microinches per inch per degree F.

8. A hollow structural filter assembly characterized by improved resistance to corrosion by sulfur-containing atmospheres at about 950° F. and formed of a plurality of porous filter elements comprising sintered iron-silicon powder of size less than 60 mesh containing 10% to 60% silicon and the balance substantially iron, and having an apparent density corresponding to about 50% to 80% of the iron-silicon alloy, said filter elements being held in end to end abutting relationship by means of a heat resistant metal framework characterized by an average coefficient of linear thermal expansion over the temperature range of 0° to 1200° F. of at least about 5 but not exceeding 7.5 microinches per inch per degree F.

9. The hollow filter assembly as defined in claim 8 wherein the assembly is substantially rectangular in shape and wherein the filter elements are substantially flat and rectangular, and have a composition ranging from about 35% to 55% silicon and the balance iron, and have an apparent density of 60% to 75% of true density.

10. The hollow filter assembly as defined in claim 8 wherein the assembly is substantially cylindrical, wherein the filter elements comprise hollow cylindrical segments held by said framework in abutting relationship, have a composition of the elements ranging from about 35% to 55% silicon and the balance substantially iron, and have an apparent density of about 60% to 75% of true density.

11. A method for producing a porous metal body from an iron-silicon alloy material, which comprises providing a powder of the material containing about 10% to 60% silicon and having a particle size of less than 60-mesh and hot pressing said powder to a predetermined volume at a pressure at least sufficient to overcome the resistance of the powder to packing at a temperature falling within the range of about 1000° C. to 1200° C. for a time sufficient to obtain a coherent porous body having an apparent density corresponding to about 50% to 80% of the density of the iron-silicon material characterized by improved resistance to corrosion by reducing sulfur-containing atmospheres at an elevated temperature of the order of about 950° F.

References Cited in the file of this patent

UNITED STATES PATENTS

| | | |
|---|---|---|
| 1,620,815 | Herschkowitsch et al. | Mar. 15, 1927 |
| 1,922,315 | Mooz | Aug. 15, 1933 |
| 1,944,183 | Kempf | Jan. 23, 1934 |
| 2,213,523 | Jones | Sept. 3, 1940 |
| 2,377,882 | Hensel | June 12, 1945 |
| 2,397,831 | Bellamy | Apr. 2, 1946 |

FOREIGN PATENTS

| | | |
|---|---|---|
| 762,072 | France | Jan. 18, 1924 |
| 369,964 | Great Britain | Mar. 18, 1932 |

OTHER REFERENCES

Goetzel: "Treatise on Powder Metallurgy," vol. I, pages 423–426, 431, 432, 436, 437, 439, 675, 676. Interscience Publishers, Inc., New York City, 1949.

Herzog: Metals and Ferro-Alloys, Metals Handbook, 1948 edition, p. 338.